3,022,981
CABLE SLACK ADJUSTER
John E. Raidel, 15002 Dunton Drive, Whittier, Calif.
Filed Oct. 5, 1960, Ser. No. 60,738
5 Claims. (Cl. 254—164)

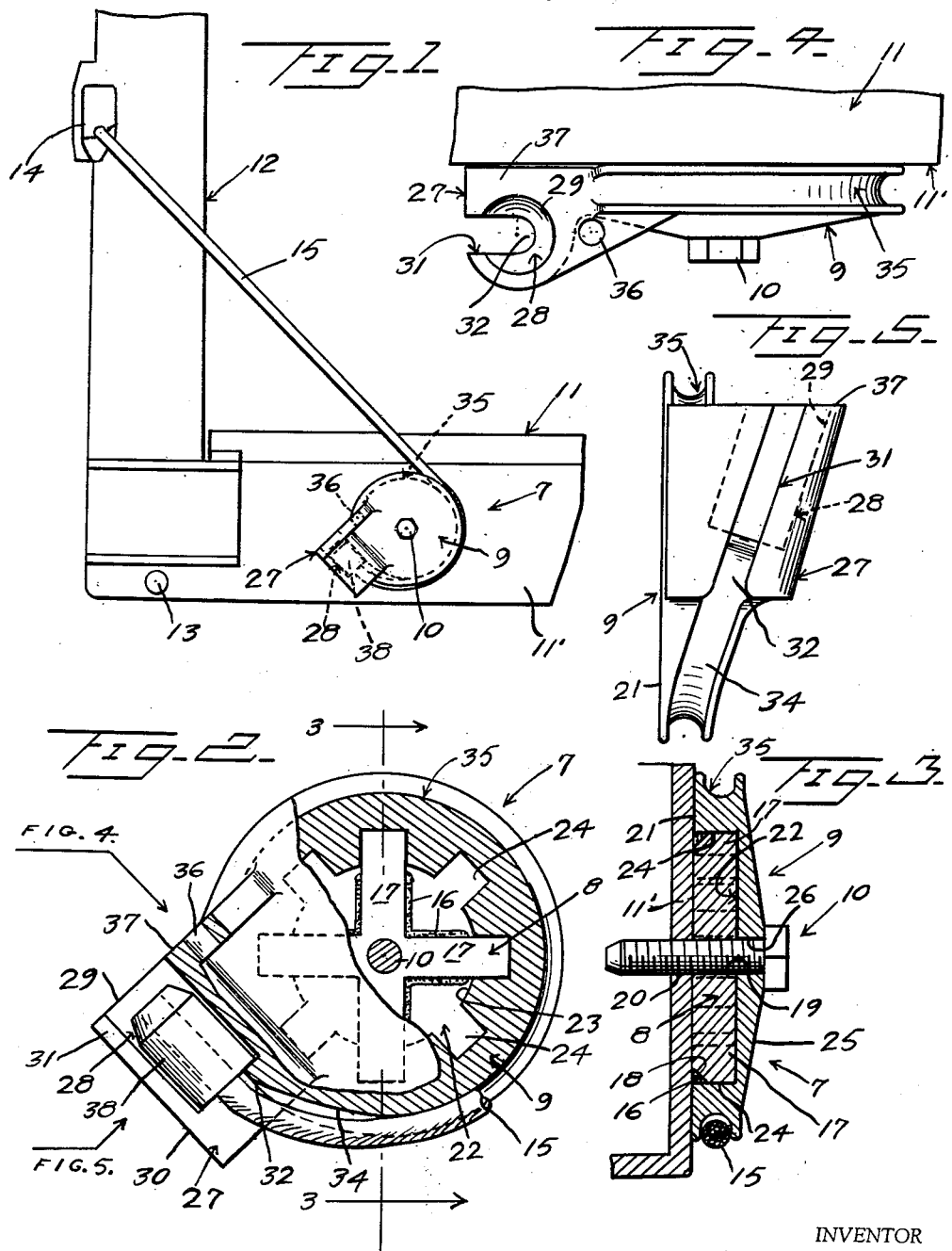

This invention relates to a device of extremely simple construction for anchoring an end of a cable or other element and which is capable of being rotatably adjusted for taking up slack in the cable.

Another object of the invention is to provide a slack adjuster of very simple construction which readily adapts itself for use in numerous applications and which may be readily applied to various elements or parts to which the cable or flexible element is to be anchored.

Various other objects and advantages of the invention will hereinafter become apparent from the following description of the drawing, illustrating a presently preferred embodiment thereof, and wherein:

FIGURE 1 is a side elevational view showing the cable slack adjuster in an operative position;

FIGURE 2 is an enlarged side elevational view, partly broken away and partly in section, and looking toward the outer side thereof;

FIGURE 3 is a sectional view taken substantially diametrically through the cable slack adjuster, substantially along a plane as indicated by the line 3—3 of FIGURE 2;

FIGURE 4 is an edge elevational view of the slack adjuster, looking in the direction as indicated by the arrow designated "FIG. 4" of FIGURE 2, and FIGURE 5 is an edge elevational view of the adjustable part of the slack adjuster, looking in the direction as indicated by the arrow designated "FIG. 5" of FIGURE 2.

Referring more specifically to the drawing, the slack adjuster 7 in its entirety and comprising the invention consists of an anchoring member 8, a body member 9, and a headed bolt 10.

For the purpose of illustrating one preferred application and use of the cable slack adjuster 7, said slack adjuster is shown applied to a side wall 11' of a conventional logging trailer bunk or bolster, designated generally 11. Only one end of the bolster 11 is shown, and the lower portion of a load confining stake 12 is shown pivoted at 13 to said bolster end extending upwardly therefrom, the stake 12 having a cable receiving opening 14 at a point considerably above the pivot and through which a cable 15 is adapted to extend. One end of the cable 15 is shown adjustably anchored to the side 11' of the bolster 11 by the slack adjuster 7, and the other end of the cable, not shown, may be anchored in any suitable manner to the other side of the bolster 11.

The anchoring member 8 is a rigid element of substantial thickness and in the form of a cross. One side of the cross 8 is disposed against the outer face of the bolster side 11', as seen in FIGURE 2, and is rigidly anchored thereto, as by means of welding, as seen at 16. The welds 16 preferably extend along inner portions of the side edges of the four arms 17 of said anchoring member and in recesses 18 which are formed in the ends and inner sides of the arms 17, as seen in FIGURE 3. The anchoring member 8 is provided with a threaded opening 19 in its center which aligns with a threaded opening 20 in the bolster side 11'.

The body member 9 is generally in the form of a relatively thick disc having a substantially flat inner side or face 21. The body 9 has a recess 22 which opens through said inner face 21 thereof. The recess 22 includes a substantially circular central portion 23 and a plurality of equally spaced notches 24 which extend radially outward from the periphery of said central portion 23 and which open inwardly thereof. Both the central portion 23 and notches 24 open through the inner face 21. The recess 22 is shown provided with eight equally spaced notches and the distance between the remote ends of the diametrically opposed notches is slightly greater than the distance between the tips of the aligned arms 17, and said notches are of a width and depth to accommodate the end portions of the arms 17, so that four alternately arranged notches 24 can receive the end portions of the four arms 17, when the anchoring member 8 is disposed in the recess 22, as seen in FIGURES 2 and 3, and the inner face of the body 9 is disposed against the outer surface of the bolster side 11'.

The outer wall 25 of the body 9 has an unthreaded central opening 26 which opens into the center of the recess 22 and which is somewhat larger than the threaded openings 19 and 20. The body 9 has an enlargement 27 which projects from a portion of its periphery and from its outer side. A socket 28 is formed in said enlargement 27 and has an open outer end 29. An outer edge 30 of the enlargement 27 has a slot 31 extending from end-to-end thereof, as best seen in FIGURES 4 and 5. The width of the slot 31 is substantially less than that of the socket 28 and a portion of the slot 31 opens into the socket 28, from end-to-end of said socket. The slot 31 is disposed parallel to the socket 28 and has a lower end of increased depth forming a restricted opening 32, an inner end of which communicates with the inner end of the socket 28, and an outer end of which communicates with one end 34 of a groove 35. The groove 35 extends around the periphery of the body 9 with the exception of the part thereof from which the enlargement 27 projects. The groove 35, with the exception of its end 34, is disposed substantially parallel to the inner face 21 and said end 34 is flared outwardly and away from the planes of the groove 35 and face 21. The bottom opening or groove 32, the slot 31 and the socket 28 are all disposed at an incline to the plane of the inner face 21 and all align with the groove end 34, so that the groove or opening 32 constitutes an extension of the groove end 34. The enlargement 27 is provided with an opening or socket 36 which opens outwardly of the end 37 of said enlargement, through which the socket end 29 opens.

The bolt 10 is loosened sufficiently from its position of FIGURES 3 and 4, so that the body 9 can be displaced away from the bolster side 11' sufficiently to disengage the body from the anchoring member 8. Normally, if the body 9 was disposed as seen in FIGURE 1, it would then be turned approximately a half a turn, after which a portion of the cable 15 would be passed inwardly through the slot 31 so that the stop or enlargement 38 on the end of the cable 15 could then be drawn into the socket 28 through the open socket end 29. With the body 9 still displaced outwardly, so that the plane of its inner face 21 is spaced outwardly from the plane of the outer surface of the anchor member 8, the body is then rotated clockwise, as seen in FIGURE 1, back toward its position of said figure. This is accomplished by inserting a rod or other leverage tool, not shown, in the opening or socket 36. As the body 9 rotates clockwise on the bolt 10, the cable 15 engages in the groove 35 and the cable is tensioned. When sufficient tension has been applied to the cable and when the body 9 is in a position so that certain of its notches 24 are in alignment with the ends of the arms 17, the body 9 is pushed or forced inwardly toward the bolster side 11' to interlock said body with the anchoring member 8, as illustrated in FIGURES 2 and 3. The bolt 10 is then tightened to prevent outward displacement of the body 9 for maintaining the desired tension on the cable 15. It will be obvious that the slack adjuster body 9 can be thus anchored in different angular positions turned 45° or one-eighth of a complete revolution thereof.

Various modifications and changes are contemplated and may be resorted to, without departing from the function or scope of the invention as hereinafter defined by the appended claims.

I claim as my invention:

1. A cable slack adjuster comprising a rigid anchor member secured immovably to and disposed to protrude from a substantially flat surface, said anchoring member having equally spaced corresponding radially extending arms, a body member having an inner side, said body member having a recess opening through said inner side and in which said anchoring member is received, said recess including circumferentially spaced radially disposed and inwardly opening notches in which the outer ends of said arms are selectively received for interlocking said body member to said anchoring member in a plurality of different rotatably adjustable positions of the body member relative to said anchoring member, a bolt extending centrally through the body member and anchoring member and threadedly engaging said anchoring member for retaining the anchoring member in the recess of the body member when the bolt is tightened, said body member being rotatable on the bolt when the bolt is loosened and the body member is displaced out of engagement with said anchoring member, said body member having a peripheral portion provided with a socket having an open outer end, through which a cable end enlargement is received, and a restricted open inner end through which the cable extends from said anchored enlargement, said body having a peripheral groove extending from the restricted open end of said socket in which a portion of the cable is wound, said body being rotatably adjustable on the bolt and relative to the anchor member for varying the tension applied to the cable.

2. A slack adjuster as in claim 1, said socket having a slot extending from end-to-end thereof and communicating with the restricted open end of the socket and of a size for the passage of the cable therethrough for positioning a part of the cable in said socket and the cable enlargement in a position to be received in the open outer socket end.

3. A cable slack adjuster as in claim 1, said body member having a tool receiving socket radially spaced from the center thereof and adapted to be engaged by a tool for rotating the body on the bolt and relative to the anchoring member and in a direction for applying tension to the cable.

4. A cable slack adjuster comprising a generally disc-shaped body having a peripheral portion provided with a socket in which a cable end enlargement is adapted to be received for anchoring a cable end secured to said enlargement to said body, said socket having an inner end provided with a restricted opening through which the cable is adapted to extend from said cable end enlargement, the periphery of said body having a groove one end of which communicates with said restricted opening of the socket and in which a portion of the cable is adapted to engage, a fixed anchoring member, a fastening adjustably secured to said anchoring member and extending centrally through said body for forming an axis about which the body is rotatable when said fastening is loosened to wind the cable in said groove for tensioning the cable when the body is turned in one direction, and said body having means for interlocking engagement with said anchor member in different positions of rotation of the body relative to the anchor member, when said fastening is tightened, for anchoring the tensioned cable.

5. A cable slack adjuster as in claim 4, said body having a recess opening outwardly of an inner side thereof and in which said anchor member is received when interlocked with the body, and said body and anchoring member having portions forming interengaging teeth constituting said means for interlocking engagement of the body with the anchoring member.

References Cited in the file of this patent

UNITED STATES PATENTS 2,264,555    Rogers _____ Dec. 2, 1941